United States Patent [19]
Phelan et al.

[11] Patent Number: 5,614,908
[45] Date of Patent: Mar. 25, 1997

[54] HELICOPTER SYSTEM WITH ROTOR BLADE ANTENNAS FOR LANDING ASSISTANCE AND FOR DETECTION OF ELECTRO-MAGNETIC ANOMALIES

[76] Inventors: Joseph P. Phelan, 74 Alloway Rd., Parsippany, N.J. 07054; Yakov Treskov, 2339 Hudson Ter., Fort Lee, N.J. 07024

[21] Appl. No.: 421,864

[22] Filed: Apr. 14, 1995

[51] Int. Cl.$^6$ .............. G01S 11/00; G01V 5/02; G01V 3/16; H01Q 1/28
[52] U.S. Cl. .............. 342/33; 250/253; 324/330; 324/344; 342/34; 343/705
[58] Field of Search .............. 324/330, 331, 324/334, 344, 72; 250/253; 244/17.11, 17.13; 342/33–35; 343/705, 708

[56] References Cited

U.S. PATENT DOCUMENTS

| | | | |
|---|---|---|---|
| 3,127,557 | 3/1964 | Gribble et al. | 324/330 |
| 3,604,660 | 9/1971 | Marley | 324/331 |
| 3,828,245 | 8/1974 | Unterberger | 324/330 X |
| 3,866,859 | 2/1975 | Hill | 324/72 X |
| 4,026,660 | 5/1977 | Ueda et al. | |
| 4,517,458 | 5/1985 | Barringer | 250/253 |
| 4,524,620 | 6/1985 | Wright et al. | |
| 4,686,475 | 8/1987 | Kober et al. | 324/349 |
| 4,841,250 | 6/1989 | Jackson | 324/349 |
| 5,036,283 | 7/1991 | Trouiller et al. | 324/375 |
| 5,148,110 | 9/1992 | Helms | 324/323 |
| 5,471,056 | 11/1995 | Prelat | 250/253 |

FOREIGN PATENT DOCUMENTS 0052053  5/1982  European Pat. Off. .............. 324/331

*Primary Examiner*—Gerard R. Strecker
*Attorney, Agent, or Firm*—Richard L. Miller, P.E.

[57] ABSTRACT

A system for assistance in landing a helicopter and for the detection of electro-magnetic anomalies utilizing helicopter blades as carriers of receiving devices in a wide spectrum of electro-magnetic fields with a predicted sensitivity and resolution far in advance of previous systems.

21 Claims, 3 Drawing Sheets

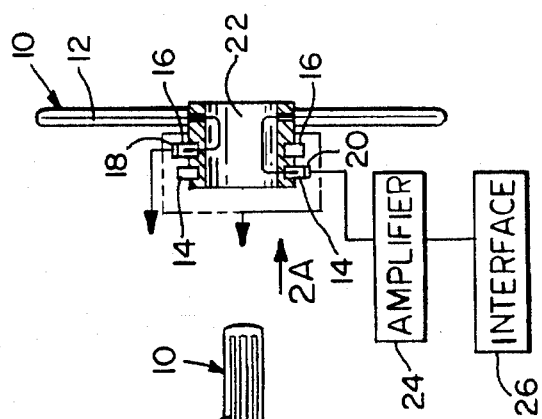
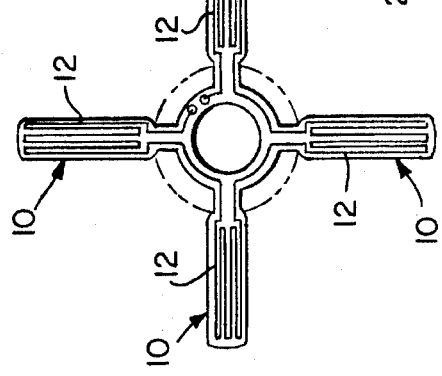

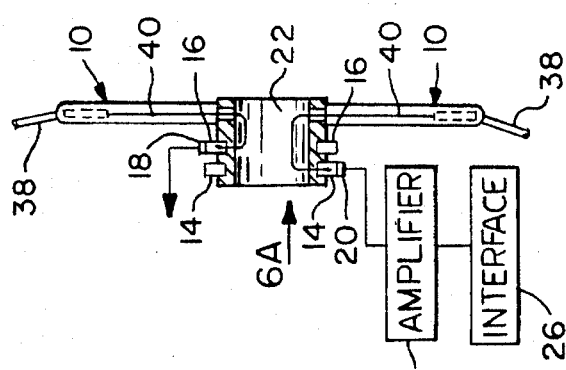
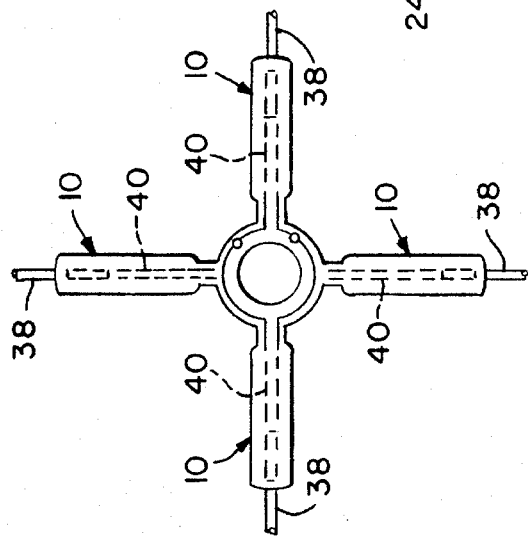
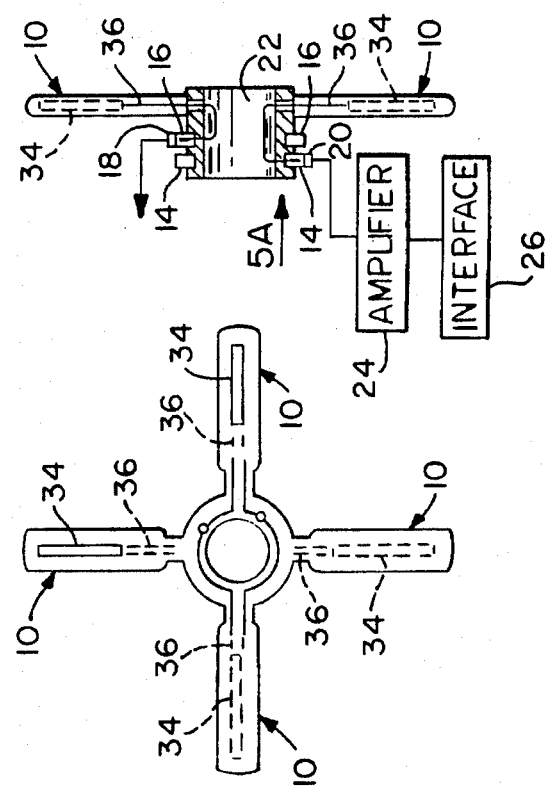
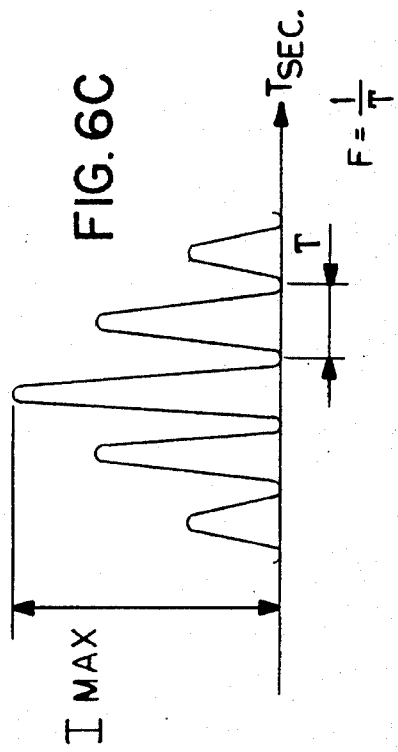
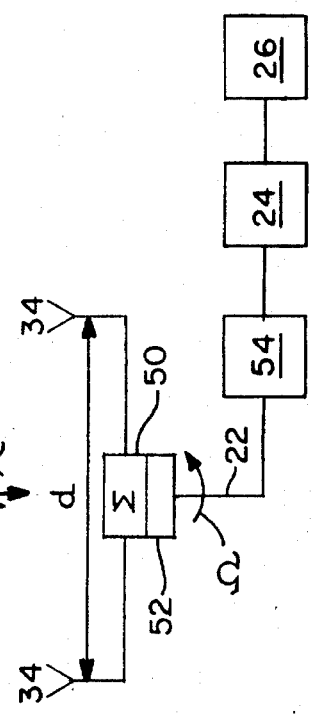

HELICOPTER SYSTEM WITH ROTOR BLADE ANTENNAS FOR LANDING ASSISTANCE AND FOR DETECTION OF ELECTRO-MAGNETIC ANOMALIES

BACKGROUND OF THE INVENTION

This invention relates to devices for the detection of electro-magnetic anomalies and, particularly, to such devices which are based on a rapidly rotating receiver.

DESCRIPTION OF RELATED ART

Devices for the detection of electro-magnetic anomalies are well known in the art. For example, a method and apparatus for measuring the resistivity of earth formations is described in U.S. Pat. No. 5,036,283 to Trouiller et al. The invention disclosed therein relates to a logging method and apparatus for determining the electrical resistivity of an earth formation traversed by a borehole. The invention provides a logging apparatus for determining the electrical resistivity, with the resistivity being determined by using a measuring pad designed to be pressed against the wall of the borehole. By moving the instrument along the wall of the borehole, a succession of readings can be obtained and logged.

A passive geophysical survey apparatus for the detection of petroleum accumulations and mineral deposits below the surface of the earth is described in U.S. Pat. No. 4,841,250 to Jackson. The invention disclosed therein provides a geophysical prospecting detector device and method of measuring potentials existing in the air in the area of the lower atmosphere between about one and ten meters above the surface of the earth in order to detect petroleum accumulations and mineral deposits below the surface of the earth. A detector device is mounted on the front bumper of a vehicle and the vehicle is moved across the surface of a given area of the earth in a continuous fashion. Changes in the electron flow through the ion field at the surface of the earth due to increased and decreased resistivity values in the crust of the earth are recorded.

A method and apparatus for passively detecting the depth and location of an anomaly by monitoring a signal emanating from the earth's surface is described in U.S. Pat. No. 5,148,110 to Helms. The invention disclosed therein provides a method and apparatus for passively determining the depth and location of an anomaly by monitoring a broad spectrum of frequencies and analyzing the amplitude and modulation of a time and/or location varying signal within discrete bands of frequencies to determine the depth of the anomaly. A means for recording and mapping subterranean features based on an ascending or descending sequence of frequency measurements is also disclosed.

A passive geophysical prospection system based upon the detection of the vertical electric field component of telluric currents is described in U.S. Pat. No. 4,686,475 to Kober et al. The invention disclosed therein provides an improved passive telluric current system for geophysical prospecting having a sensor responsive to the electric field component of the telluric current for producing a capacitive charge, a tuner for deconvoluting the sensed electric field telluric signal, and a cross-over circuit for generating a stereo audio output signal containing the telluric information. This stereo audio signal has a low band audio output and a high band audio output for delivery to the left and right ears of an operator. By having both a low band and a high band audio output, the frequency transitions contained in the telluric signal are enhanced in the ears of the operator.

None of these patents disclose a detection system that utilizes rotating or spinning blades as carriers of receiving devices in a wide spectrum of electro-magnetic fields to perform a sweeping search for anomalies. Consequently the resolution of each of the previously described background art devices is severely limited when compared with the predicted resolution of the instant invention.

SUMMARY OF INVENTION, OBJECTS AND ADVANTAGES

The present invention aims to provide a system comprising rotating or spinning blades which are equipped with receiving sets to sense electrical and magnetic disturbances. Upon analysis, these disturbances would indicate the existence and boundaries of anomalies. The blades contemplated include any rotating blades such as, for example, the blades of a helicopter, a fan, or a turbine. The receiving sets contemplated by this invention, include devices which can detect anomalies in the entire range of the electro-magnetic spectrum, including electromagnetic waves, radio waves, infrared radiation (thermal and light radiation), X-ray radiation, and radioactive radiation. In cases where such a system utilized fewer receiving sets than the number of blades, proper ballast would be required on the remainder to insure a balanced rotating system.

As used herein, an "anomaly" may include (but not necessarily limited to) natural and man made occurrences such as seismic strain in rock strata, the passage of low flying and/or small objects on a background of lake, ocean or any water surfaces, geologic structures including iron ore deposits, buried avalanche victims, and any other electro-magnetic deviations from the normal background which the invention is able to detect.

The main conditions which gain the best results for the receiving devices of technical systems:

Distance between receiving devices should be kept as large as possible;

The linear and rotational speed of the receiving device should be as great as possible;

The number of receiving devices should be as great as possible, and

In the case of an interferometer, a pair of receiving devices should be employed, that is a pair or pairs of antennas.

Blades, such as those of a helicopter, can be used as carriers of receiving devices in a wide spectrum of electro-magnetic fields. The means by which the receiving devices are carried by the blades could be by being mounted on the surface of the blades, by being attached to the tips of the blades, or by being installed within the blades. A helicopter is a tool which performs movement as a vehicle, and at the same time can work as a carrier of receiving, detecting devices. The motion of the helicopter blades and hence, the relative motion of the paired receiving devices to each other acts to boost otherwise low resolving capabilities to advanced levels. The specificity of the receiving devices attached to the tips of, mounted on the surfaces of, or mounted within the interior of the helicopter blades combined with the tactical capabilities of the helicopter create a type of device which will have many useful military and industrial applications. Because of the blade speed and distance between receptors, it can be predicted that the degree of resolution afforded by such an arrangement will greatly exceed that of any system currently in use. This invention could possibly revolutionize current detection technology and affect a wide range of industries from geologic surveying to medical diagnoses.

A first application for this invention is the detection of the electrical and magnetic fields created by such natural phenomena as deposits of a magnetic ore. To detect activity in this part of the electro-magnetic spectrum, the helicopter blades would be equipped with receiving sets which may include, for instance, a winding of electrical cord. With this setup, the blades of the helicopter function as a rotor, and the surface under the helicopter functions as a stator. An electrical current is generated in the winding of the blades by a rotation of the blades above the surface of a magnetic anomaly.

When the receiving sets include windings of electrical cord, the amplitude of the electrical current generated is a function of the amplitude of energy of the anomaly, the angular speed of the whirling helicopter blades, the linear speed of the helicopter, and the amount of winding on or within the blades, and is inversely proportional to the square of the altitude of the helicopter above the anomaly. Thus by increasing either or both of the angular velocity of the blades or the amount of winding on or within the blades, the amplitude of the current is increased thus greatly increasing the sensitivity and resolution of a system which includes this invention. As a result, anomalies far too weak to be noticed by conventional detection devices may now be observable for the first time.

A second application for this invention is the detection of radio waves. For this purpose the receiving sets would be antennas mounted on or within the blades. The large distance between the antennas mounted on or within adjacent blades would allow one to construct a radio interferometric modular receiving device with a wide range of frequencies and with a high sensitivity and precision of detection. A standard high frequency interface can be used for the connection between the antennas. This device can also be used for landing of the helicopter by turning the antennas downward.

When the receiving sets are antennas, the amplitude of the electrical current generated is a function of the amplitude of energy of the anomaly, the angular speed of the whirling helicopter blades, the linear speed of the helicopter, and the number of antennas, and is inversely proportional to the square of the altitude of the helicopter above the anomaly.

A third application for this invention is altitude measurement. This measurement is based on the well known Doppler effect for defining an altitude at the given speed, and vice versa, defining a speed at the given altitude.

A fourth application for this invention is the detection of infra-red radiation, thermal radiation and light radiation. For this purpose, the helicopter blades are equipped with a receiving set for the infra-red spectrum of radiation. The rotation of the helicopter blades causes a modulation of received radiation. A potential application for this particular arrangement could be to locate buried avalanche victims by distinguishing their thermal fingerprint from the background snow.

For this fourth application, the amplitude of the electrical current generated is a function of the amplitude of energy of the anomaly, the angular speed of the whirling helicopter blades, the linear speed of the helicopter, and the specific characteristics of the receiving sets selected, and is inversely proportional to the square of the altitude of the helicopter above the anomaly.

A fifth application for this invention is the detection of radioactive and X-ray radiation. Receiving sets for the detection of radioactive and X-ray radiation are built into the helicopter blades, which will modulate the received radiation of the anomaly while rotating above it.

For this fifth application, the amplitude of the electrical current generated is a function of the amplitude of energy of the anomaly, the angular speed of the whirling helicopter blades, the linear speed of the helicopter, and the specific characteristics of the receiving sets selected, and is inversely proportional to the square of the altitude of the helicopter above the anomaly.

To summarize, the instant invention is a device for the detection of electro-magnetic anomalies. This device is predicted to have a degree of resolution greatly exceeding that of any of the previously described background art devices and exceeding that of any system currently in use. This device comprises a rotor shaft; a plurality of rotor blades mounted on the rotor shaft; rotatable driving means to rotate the rotor shaft, which in turn causes the rotor blades to spin; a receiving set mounted on or within each rotor blade; and means for receiving a signal from the receiving sets; whereby when the rotatable driving means causes the rotor shaft to rotate, the rotor blades are caused to spin, and any signal generated by the receiving sets mounted on or within the spinning rotor blades is received by the means for receiving a signal from the receiving sets. The receiving sets which may be mounted on or within the rotor blades include receiving sets for the sensing of electrical and magnetic disturbances, receiving sets for the sensing of radio waves, infrared receiving devices, and radiation sensors.

It is therefore an object of the present invention to provide a means of detecting electro-magnetic anomalies hitherto too weak to be detected by the background art devices.

A second object of the instant invention is to provide a means of using helicopter blades or other rapidly rotating, widely spaced receivers to detect mobile targets at low altitudes.

A third object of the instant invention is to allow construction of a radio interferometric modular receiving device with a wide range of frequencies and with a high sensitivity and precision of detection.

A fourth object of the instant invention is to provide a device useful for landing of a helicopter.

A fifth object of the instant invention is to provide a device to be used for measuring the altitude of the vehicle carrying the device.

A sixth object of the instant invention is to provide a device to be used for locating buried avalanche victims by distinguishing their thermal fingerprint from the background snow.

A seventh object of the instant invention is to provide a device to be used for aiding a pilot during a helicopter landing (especially in poor visibility).

An eighth object of the instant invention is to provide a device to be used for assisting in the forecasting of earthquakes since the predicted degree of resolution will be fine enough to discern the specific energies generated by the stresses in rock strata at fault lines.

Thus the instant invention is a system which can be used in detecting a wide range of electro-magnetic phenomena and anomalies with a predicted precision and resolution exceeding that of any of the background art devices. Consequently this device will have a wide range of uses in many fields.

The invention allows for the fine tuning of the incoming detected signal by increasing and decreasing the rotational speed of the blades. Note that in such a case one would need a means of actively varying the aerodynamic "angel of attack" of the blades so as to avoid a sudden gain or loss in altitude. This feature could thus only be utilized by helicopters possessing such control.

Further scope of applicability of the present invention will become apparent from the detailed description given hereafter. However, it should be understood that the drawings and the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 1 is a diagrammatic illustration of several applications within the spectrum of static and electromagnetic fields for various embodiments of the instant invention.

FIG. 2 is a diagrammatic partial cross sectional view of an inductive embodiment of the instant invention.

FIG. 2A is a plan view taken in the direction of arrow 2A in FIG. 2.

FIG. 5 is a diagrammatic partial cross sectional view of a first radio wave sensor embodiment of the instant invention.

FIG. 5A is a plan view taken in the direction of arrow 5A in FIG. 5.

FIG. 6 is a diagrammatic partial cross sectional view of a second radio wave sensor embodiment of the instant invention.

FIG. 6A is a plan view taken in the direction of arrow 6A in FIG. 6.

FIG. 6B is a schematic diagram illustrating an interferometer installed on helicopter blades.

FIG. 6C is a typical representation of the signal present after detection at the output of the interferometer.

DESCRIPTION OF PREFERRED EMBODIMENT

Figure 4:
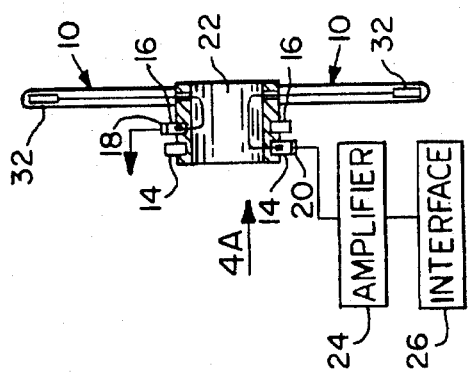
FIG. 4 is a diagrammatic partial cross sectional view of a radiation sensor embodiment of the instant invention.

Referring to the figures, FIG. 1 shows the various portions of the spectrum in which the instant invention has applicability. A large variety of the spectrum of electro-magnetic fields are illustrated in FIG. 1, from stationary (permanent) fields to variable ones. As FIG. 1 indicates, the entire spectrum can be divided into 4 areas: Electro-magnetic, Radio Waves, Infra-red, and Radiation.

Area 1 (FIG. 1, Column A) represents stationary (permanent) electrical and magnetic fields, created by natural phenomena (e.g. deposits of a magnetic ore). For the sensing of electrical and magnetic disturbances and the detection of anomalies in area 1, the blades of the helicopter (FIG. 1, Column A, Row 2) are equipped with receiving sets which may include, for instance, a winding of electrical cord, and connected as shown in FIGS. 2A and 2. Referring to FIG. 2A, the four blades 10 have mounted within them windings of electrical cord 12. Referring to FIG. 2, the blades 10 are mounted on rotating shaft 22. Fixedly mounted on the rotating shaft 22, are two slip rings 14 and 16. As the shaft 22 rotates, the slip rings 14 and 16 contact immovable contact brushes 20 and 18 respectively. The signal generated in the windings of electrical cord 12 is then conducted to the slip rings 14 and 16 and thus to the immovable contact brushes 18 and 20, and then to amplifier 24. After being amplified by the amplifier 24, the signal is transmitted to the interface 26 with the microcomputer of a display device.

With this setup, the blades of the helicopter function as a rotor, and the surface under the helicopter functions as a stator. An electrical signal is generated in the winding of the blades by a rotation of the blades above the surface of a magnetic anomaly.

The parameters of the current, I, associated with the signal are dependent on the major characteristics of the anomaly, the nature of the helicopter's movement, the amount of winding mounted within the blades, the angular velocity of the helicopter blades, the linear speed of the helicopter, and the altitude of the flight above the surface of the anomaly.

This relationship can be expressed as follows:

$$I_{max} = f(E_{max}, R_u, V, N, 1/h^2)$$

where:

$I_{max}$ = the maximum value of the electrical current, I $E_{max}$ = the amplitude of energy of the anomaly;

$R_u$ = angular speed of the helicopter blades in revolutions per second; $R_u$ can also be expressed as $\Omega$;

V = the linear speed of the helicopter in meters per second;

N = amount of winding on the blades, unitless and h = altitude of the helicopter in relationship to the anomaly, meters It is to be noted that the amplitude of the electrical current generated increases with increasing angular velocity of the whirling helicopter blades and with the amount of winding on the blades. Thus by increasing either or both of the angular velocity of the blades or the amount of winding on the blades, the amplitude of the current is increased, thus greatly increasing the sensitivity and resolution of the system which includes this invention.

The device based on the design described above can be applied, for example, to geological needs, in emergency service, as a landing tool, and for military missions.

FIG. 1, Column A, Row 5 shows the instant invention being used for an active search of a magnetic anomaly.

Area 2 (FIG. 1, Column B) is the radio wave portion of the spectrum. For the sensing of radio waves and the detection of anomalies in area 2, the blades of the helicopter (FIG. 1, Column B, Row 2) are equipped with N pairs of antennas for receiving radio waves, where N is a positive, even integer. In a first embodiment of the invention, the antennas are connected as shown in FIGS. 5A and 5. Referring to FIG. 5A, any number of blades 10 (four are shown as an example) have mounted within them antennas 34. Connected to the antennas 34 are sections of coaxial cable 36. Referring to FIG. 5, the blades 10 are mounted on rotating shaft 22. Fixedly mounted on the rotating shaft 22, are two slip rings 14 and 16. As the shaft 22 rotates, the slip rings 14 and 16 contact immovable contact brushes 20 and 18 respectively. The signal generated in the antennas 34 is thus conducted by sections of coaxial cable 36 to the slip rings 14 and 16 and thus to the immovable contact brushes 18 and 20, and then to amplifier 24. After being amplified by the amplifier 24, the signal is transmitted to the interface 26 with the microcomputer of a display device.

In a second embodiment of the invention, the antennas are connected as shown in FIGS. 6A and 6. Referring to FIG. 6A, the four blades 10 have projecting from the blade tips exterior antennas 38. Connected to the antennas 38 are sections of coaxial cable 40. Referring to FIG. 6, the blades 10 are mounted on rotating shaft 22. Fixedly mounted on the rotating shaft 22, are two slip rings 14 and 16. As the shaft 22 rotates, the slip rings 14 and 16 contact immovable contact brushes 20 and 18 respectively. The signal generated in the antennas 38 is thus conducted by sections of coaxial cable 40 to the slip rings 14 and 16 and thus to the immovable contact brushes 18 and 20, and then to amplifier 24. After being amplified by the amplifier 24, the signal is transmitted to the interface 26 with the microcomputer of a display device.

For both of these embodiments, the parameters of the current, I, associated with the signal are dependent on the major characteristics of the anomaly, the nature of the helicopter's movement, the number of antennas, the angular velocity of the helicopter blades, and the altitude of the flight above the surface of the anomaly.

This relationship can be expressed as follows:

$$I_{max} = f(E_{max}, R_u, V, N, 1/h^2)$$

where:

$I_{max}$=the maximum value of the electrical current, I;

$E_{max}$=the amplitude of energy of the anomaly;

$R_u$=angular speed of the helicopter blades in revolutions per second; $R_u$ can also be expressed as $\Omega$;

V=the linear speed of the helicopter in meters per second;

N=the number of antennas, unitless; and h=altitude of the helicopter in relationship to the anomaly, meters.

The large distance between the antennas mounted on the helicopter blades allows one to construct a radio interferometric modular receiving device with a wide range of frequencies and with a high sensitivity and precision of detection. A standard high frequency interface can be used for the connection between a pair of antennas.

An interferometer is defined herein as a pair of antennas, connected by a high frequency interface. As shown diagrammatically in FIG. 6B, a signal picked up by a pair of antennas 34 proceeds through a summation device 50, followed by a standard high frequency interface 52, the rotating helicopter shaft 22 transmits the signal to the detector 54. After being amplified by the amplifier 24, the signal is transmitted to the interface 26 with the microcomputer of a display device. A typical representation of the signal after detection is illustrated in FIG. 6C.

The second embodiment of the invention as shown in FIGS. 6A and 6 can be used for landing a helicopter by turning the antennas 38 downward.

FIG. 1, Column B, Row 5 illustrates the potentials for active exploration of various surfaces in such areas of application as geology, farming, and defense. Another possible application of this invention is altitude measurement. This measurement is based on the well known Doppler effect for defining an altitude at the given speed, and vice versa, defining a speed at the given altitude.

Figure 3:
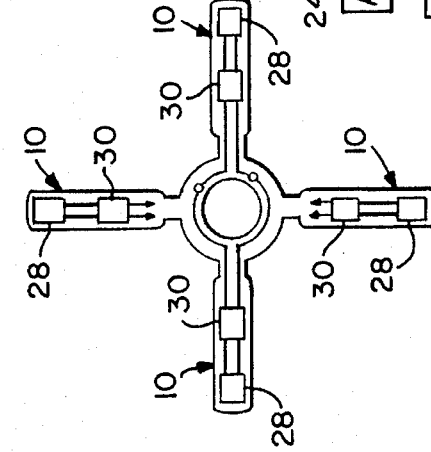
FIG. 3 is a diagrammatic partial cross sectional view of an infrared optical embodiment of the instant invention.
Figure 3A:
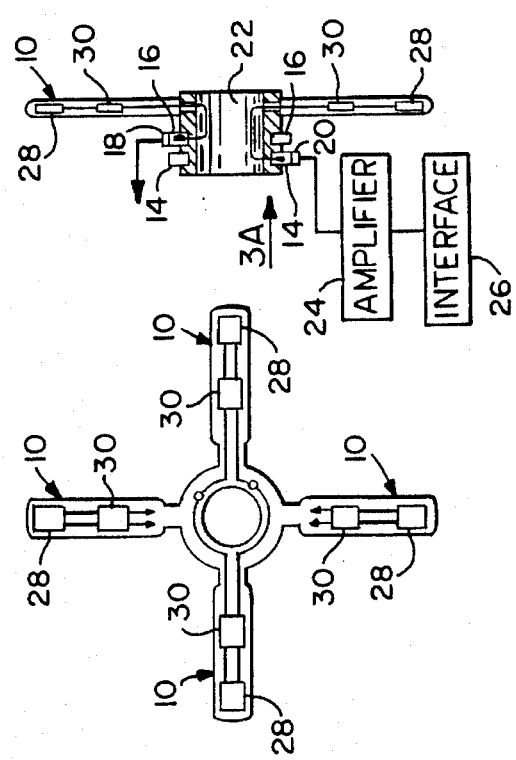
FIG. 3A is a plan view taken in the direction of arrow 3A in FIG. 3.

Area 3 (FIG. 1, Column C) is the infra-red radiation (both thermal and light radiation) portion of the spectrum. For the sensing of infra-red radiation and the detection of anomalies in area 3, the blades of the helicopter (FIG. 1, Column C, Row 2) are equipped with receiving sets for the infra-red spectrum of radiation. These receiving sets are connected as shown in FIGS. 3A and 3. Referring to FIG. 3A, the four blades 10 have mounted within them optics systems 28 and initial input amplifiers 30. Referring to FIG. 3, the blades 10 are mounted on rotating shaft 22. Fixedly mounted on the rotating shaft 22, are two slip rings 14 and 16. As the shaft 22 rotates, the slip rings 14 and 16 contact immovable contact brushes 20 and 18 respectively. The signals generated in the optics systems 28 are transmitted to the initial input amplifiers 30 where the signals are amplified. Then the amplified signals are conducted to the slip rings 14 and 16 and thus to the immovable contact brushes 18 and 20, and then to amplifier 24. After being amplified by the amplifier 24, the signals flow to the interface 26 with the microcomputer of a display device.

The parameters of the current, I, associated with the signal are dependent on the major characteristics of the anomaly, the nature of the helicopter's movement, the characteristics of the infrared receiving sets, the angular velocity of the helicopter blades, the linear speed of the helicopter, and the altitude of the flight above the surface of the anomaly.

This relationship can be expressed as follows:

$$I_{max} = f(E_{max}, R_u, V, N, 1/h^2)$$

where:

$I_{max}$=the maximum value of the electrical current, I;

$E_{max}$=the amplitude of energy of the anomaly;

$R_u$=angular speed of the helicopter blades in revolutions per second; $R_u$ can also be expressed as $\Omega$;

V=the linear speed of the helicopter in meters per second;

N=a quantity depending on the characteristics of the infrared receiving sets, unitless; and h=altitude of the helicopter in relationship to the anomaly, meters The rotation of the helicopter blades causes a modulation of received radiation. A potential application for this particular arrangement could be to locate buried avalanche victims by distinguishing their thermal fingerprint from the background snow.

FIG. 1, Column C, Row 3 shows the instant invention being used for helicopter landing.

FIG. 1, Column C, Row 5 indicates the possibility for active exploration of the land surface for geological needs, farming, or defense.

Figure 4A:
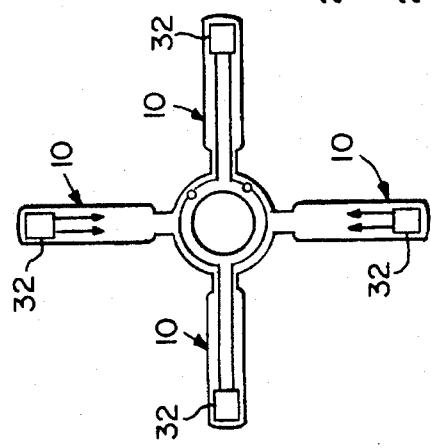
FIG. 4A is a plan view taken in the direction of arrow 4A in FIG. 4.

Area 4 (FIG. 1, Column D) is the radioactive and X-ray radiation portion of the spectrum. For the sensing of radioactivity and X-ray radiation and the detection of anomalies in area 3, the blades of the helicopter (FIG. 1, Column D, Row 2) are equipped with receiving sets for the radioactive and X-ray radiation portion of the spectrum. These receiving sets are built into the helicopter blades, and are connected as shown in FIGS. 4A and 4. Referring to FIG. 4A, the four blades 10 have mounted within them radiation sensors 32. Referring to FIG. 4, the blades 10 are mounted on rotating shaft 22. Fixedly mounted on the rotating shaft 22, are two slip rings 14 and 16. As the shaft 22 rotates, the slip rings 14 and 16 contact immovable contact brushes 20 and 18 respectively. The signals generated in the radiation sensors 32 are conducted to the slip rings 14 and 16 and thus to the immovable contact brushes 18 and 20, and then to amplifier 24. After being amplified by the amplifier 24, the signals are transmitted to the interface 26 with the microcomputer of a display device.

The parameters of the current, I, associated with the signal are dependent on the major characteristics of the anomaly, the nature of the helicopter's movement, the characteristics of the receiving sets, the angular velocity of the helicopter blades, the linear speed of the helicopter, and the altitude of the flight above the surface of the anomaly.

This relationship can be expressed as follows:

$$I_{max}=f(E_{max}, R_u, V, N, 1/h^2)$$

where:
- $I_{max}$=the maximum value of the electrical current, I;
- $E_{max}$=the amplitude of energy of the anomaly;
- $R_u$=angular speed of the helicopter blades in revolutions per second; $R_u$ can also be expressed as $\Omega$.
- V=the linear speed of the helicopter in meters per second
- N=a quantity depending on the characteristics of the receiving sets, unitless
- h=altitude of the helicopter in relationship to the anomaly, meters The receiving sets of the radiation modulate the received radiation of the anomaly while rotating above it.

As indicated in FIG. 1, Column D, Row 3, the device can be used to aid the pilot during a helicopter landing (especially in poor visibility).

FIG. 1, Column D, Row 5 illustrates exploring for an anomaly in a region below the helicopter in the radiation and X-ray portion of the spectrum.

For each of the embodiments described for the electro-magnetic, radio wave, infrared, and radiation spectrums, it is important to note that when the helicopter is flying at a low altitude, the V in each of the functional relationships for $I_{max}$ can be expressed as an angular speed of the helicopter relative to the anomaly, since, $V/h=R_u$. Thus $I_{max}$ can be expressed as $$I_{max}=f(E_{max}, R_u, R_{u2}, N, 1/h^2)$$

where:
- $R_{u2}$ is the angular speed of the helicopter relative to the anomaly.

For the embodiments described for the electro-magnetic, infrared, and radiation spectrums, the frequency or clarity of the incoming signal can be expressed as $$F=2\pi nN/60=\pi nN/30$$

where,
- F=the clarity of the signal received from the anomaly, Hertz (1/sec)
- n=the number of the revolutions per minute of the blades
- N=the number of detectors (the more blades on the helicopter, the greater number of detectors)

For the embodiments described for the radio wave spectrum, the frequency or clarity of the incoming signal can be expressed as $$F=(d/\lambda)\cdot(\pi n/30)$$

where,
- F=the clarity of the signal received from the anomaly, Hertz (1/sec)
- n=the number of the revolutions per minute of the blades
- d=the distance between blade mounted antennas, meters
- $\lambda$=the wavelength of the incoming signal in meters Frequency expressed in terms of linear movement of the detection devices relative to the anomaly is $$F=(d/\lambda)\cdot(V/h)$$

where,
- F=the clarity of the signal received from the anomaly, Hertz (1/sec)
- V=the linear speed of the helicopter, meters/sec
- d=the distance between blade mounted antennas, meters
- $\lambda$=the wavelength of the incoming signal or radiation in meters
- h=the distance or height of the antennas above the anomaly, in meters It should be noted that the clarity of modulation of F not only increases the chances of detection, but also provides ample information about the anomaly.

The following variables can be determined from the clarity of the signal (F), depending on the spectrum:
- speed of the blades, n;
- the wavelength of the incoming signal, $\lambda$;
- the linear speed of the helicopter, V; and
- altitude of the helicopter relative to the anomaly, h.

Figure 7:
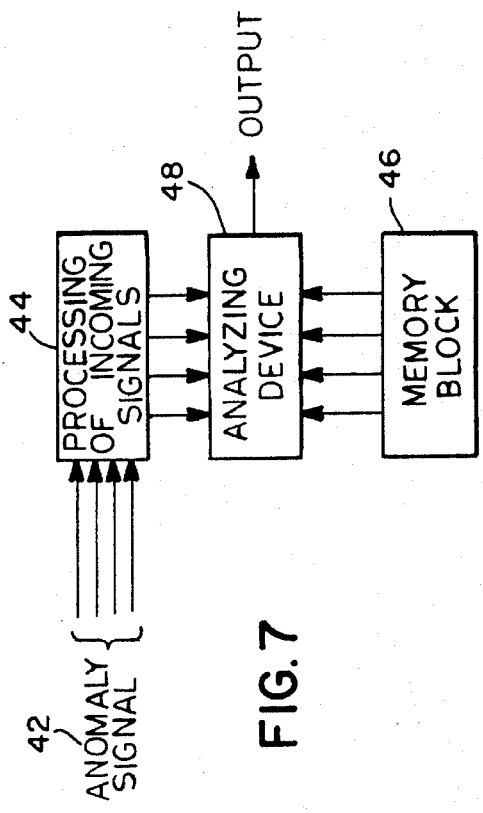
FIG. 7 is a block diagram of the signal processing apparatus of the instant invention.

FIG. 7 displays the scheme of a combined detective system with a predicted higher precision of analysis and classification of an anomaly based on specific characteristics. This analysis can lead to results which would define the type of anomaly (natural, geological, technical, or industrial) and its carrier.

FIG. 7 depicts a combined detective system for the analysis and classification of signals received from a system which is composed of devices selected from the group consisting of receiving sets for the sensing of electrical and magnetic disturbances, receiving sets for the sensing of radio waves, infrared receiving devices, and radiation sensors.

First the Anomaly Signal 42 is sent to Processing of Incoming Signals 44. Processing of Incoming Signals 44 samples the incoming signal, thus obtaining the most recently taken signal sample. Then Processing of Incoming Signals 44 removes noise from the most recently taken signal sample. Next the most recently taken signal sample is stored in the Memory Block 46. The Memory Block 46 comprises a record of all previously taken signal samples. Then the Analyzing Device 48 compares the most recently taken signal sample with the values of previously taken signal samples in the Memory Block 46, to generate an updated indication of the boundaries and classification of the anomaly.

The same combined device can provide a very convenient tool for helicopter landings by different types of electromagnetic fields. This kind of device can also be used as a potential earthquake forecaster since the degree of resolution will be fine enough to discern the specific energies generated by the stresses in rock strata at fault lines.

This combined device, as shown in FIG. 1, Row 6, has advantages which are evident from the illustration shown in the figure. One of these advantages is its use in detecting low flying, small objects on the background of lake or ocean water surfaces. This has profound implications for regions where "dead zones" exist in current radar detection at low altitudes. One might use this technology to set up large, rapidly rotating sensing blades on high towers at country borders. The technology could discourage the drug trafficking that occurs when small planes fly low (and undetected) over such borders.

From the foregoing, it will be seen that what has been provided is a novel device for the detection of electromagnetic anomalies utilizing various devices installed on or within rapidly rotating blades. In addition to the uses already disclosed, this device may have additional applications in the field of medicine:

1) Using a large fan instead of a helicopter, one could mount various active and passive sensing devices on or within the blade tips. Because of the increased resolution, it would be possible to distinguish weak electro-magnetic fields emanating from living beings or plants placed in a room in front of the fan. The blades would be straightened so as not to create excessive air velocity in the room and their speed could then be increased to many thousands of RPM. Such an application could greatly advance current medical knowledge.

CONCLUSION, RAMIFICATIONS, AND SCOPE OF INVENTION

Thus the reader will see that the instant invention supplies a long felt need for an anomaly detection device with a predicted precision and resolution exceeding that of anything shown in the background art. The applicants are confident that this invention represents a major breakthrough in detection technology. There are many variations of this anomaly detection device which will be apparent to those skilled in the art which can be made without departing from the inventive concepts expressed herein. Accordingly, the scope of this invention should be determined not by the embodiments described herein, but by the appended claims and their legal equivalents.

What is claimed is:

1. A helicopter system including a helicopter having a linear speed, an angular speed, and pilot landing assisting capabilities that assist a pilot in landing a helicopter on a landing site, said system comprising:

a) radio wave generating means for generating radio waves at the landing site; said radio waves having amplitudes and a wavelength;

b) a helicopter body;

c) a shaft rotatively mounted to said helicopter body;

d) a pair of slip rings fixedly attached to said shaft for rotation therewith;

e) a plurality of blades having tips and being attached to said shaft for rotation therewith; said plurality of blades having a variable pitch and a variable angular velocity, so that as said variable angular velocity of said plurality of blades varies to allow for fine tuning of reception of said radio waves generated by said radio wave generating means, said variable pitch of said plurality of blades varies accordingly so as to prevent a sudden change in altitude of said helicopter;

f) an even number of slender, cylindrically-shaped, and downwardly-extending exterior antennae for receiving said radio waves generated by said radio wave generating means and generating a current responsive thereto; each antenna of said even number of slender, cylindrically-shaped, and downwardly-extending exterior antennae extending downwardly from a tip of a different blade of said plurality of blades;

g) a plurality of coaxial cables; each cable of said plurality of coaxial cables extending longitudinally through a different blade of said plurality of blades from an antenna of said even number of slender, cylindrically-shaped, and downwardly-extending exterior antennae to said pair of slip rings, so that said even number of slender, cylindrically-shaped, and downwardly-extending exterior antennae are in electrical communication with said pair of slip rings and said current generated by said even number of slender, cylindrically-shaped, and downwardly-extending exterior antennae flows to said pair of slip rings;

h) a pair of immovable brushes being in electrical communication with said pair of slip rings while said plurality of blades rotate, so that said current flows from said pair of slip rings to said pair of immovable brushes while said plurality of blades rotate;

i) an amplifier being in electrical communication with said pair of immovable brushes and amplifying said current from said pair of immovable brushes, so that said current flows from said pair of immovable brushes to said amplifier and is amplified thereby so as to produce an amplified current;

j) a microcomputer interface being in electrical communication with said amplifier, so that said amplified current flows from said amplifier to said microcomputer interface;

k) a microcomputer being in electrical communication with said microcomputer interface, so that said amplified current flows from said microcomputer interface to said microcomputer; and l) a display device being in electrical communication with said microcomputer for displaying a signal representative of said amplified current, so that said amplified current flows from said microcomputer to said display device; said signal being a function of altitude of said even number of slender, cylindrically-shaped, and downwardly-extending exterior antennae above the landing site and said amplitude of said radio waves received by said even number of slender, cylindrically-shaped, and downwardly-extending exterior antennae, so that by monitoring said signal displayed on said display device said altitude of said helicopter above the landing site and proximity of said helicopter to the landing site can be monitored and used to assist the pilot of said helicopter in landing said helicopter on the landing site.

2. The helicopter system including the helicopter as defined in claim 1, wherein said current generated by said even number of slender, cylindrically-shaped, and downwardly-extending exterior antennae has an amplitude that is a function of said amplitudes of said radio waves received by said even number of slender, cylindrically-shaped, and downwardly-extending exterior antennae, said angular velocity of said plurality of blades, said linear speed of said helicopter, and number of antennae of said even number of slender, cylindrically-shaped, and downwardly-extending exterior antennae, and is inversely proportional to square of said altitude of said helicopter above said radio wave generating means, so that $$I_{max} = f(E_{max}, R_w, V, N, 1/h^2)$$

wherein:

$I_{max}$ is maximum value of said current generated by said even number of slender, cylindrically-shaped, and downwardly-extending exterior antennae;

$E_{max}$ is said amplitude of energy of said radio waves received by said even number of slender, cylindrically-shaped, and downwardly-extending exterior antennae;

$R_u$ is said angular velocity of said plurality of blades of said helicopter expressed in revolutions per second;

V is said linear speed of said helicopter expressed in meters per second;

N is said number of said even number of slender, cylindrically-shaped, and downwardly-extending exterior antennae; and h is said altitude of said helicopter above said radio wave generating means expressed in meters.

3. The helicopter system including the helicopter as defined in claim 2, wherein said V is said linear speed of said helicopter relative to said radio wave generating means when said helicopter has reached a low altitude above said radio wave generating means, so that $$V/h = R_{u2}$$

and therefore $$I_{max} = f(E_{max}, R_u, R_{u2}, N, 1/h^2)$$

wherein:

$R_{u2}$ is said angular speed of said helicopter relative to said radio wave generating means.

4. The helicopter system including the helicopter as defined in claim 1, wherein said radio waves received by said even number of slender, cylindrically-shaped, and downwardly-extending exterior antennae have a frequency, so that $$F = (d/\lambda) \cdot (\pi n/30)$$

wherein:

F is said frequency of said radio waves received by said even number of slender, cylindrically-shaped, and downwardly-extending exterior antennae expressed in Hertz (1/sec);

n is said angular velocity of said plurality of blades expressed in number of revolutions per minute;

d is distance between opposing antennae of said even number of slender, cylindrically-shaped, and downwardly-extending exterior antennae; and $\lambda$ is said wavelength of said radio waves received by said even number of slender, cylindrically-shaped, and downwardly-extending exterior antennae expressed in meters.

5. The helicopter system including the helicopter as defined in claim 1, wherein said even number of slender, cylindrically-shaped, and downwardly-extending exterior antennae has a linear movement and said radio waves received by said even number of slender, cylindrically-shaped, and downwardly-extending exterior antennae have a frequency that is said linear movement of said even number of slender, cylindrically-shaped, and downwardly-extending exterior antennae relative to said radio waves generated by said radio wave generating means, so that $$F = (d/\lambda) \cdot (V/h)$$

wherein:

F is said frequency of said radio waves received by said even number of slender, cylindrically-shaped, and downwardly-extending exterior antennae expressed in Hertz (1/sec);

V is said linear speed of said helicopter expressed in meters/sec;

d is distance between opposing antennae of said even number of slender, cylindrically-shaped, and downwardly-extending exterior antennae expressed in meters;

$\lambda$ is said wavelength of said radio waves received by said even number of slender, cylindrically-shaped, and downwardly-extending exterior antennae expressed in meters; and h is distance of said even number of slender, cylindrically-shaped, and downwardly-extending exterior antennae above said radio wave generating means expressed in meters.

6. The helicopter system including the helicopter as defined in claim 1; further comprising:

a) a summation device being in electrical communication with a pair of opposing antennae of said even number of slender, cylindrically-shaped, and downwardly-extending exterior antennae; said summation device receiving and combining said current from said pair of opposing antennae of said even number of slender, cylindrically-shaped, and downwardly-extending exterior antennae, so that said current from said pair of opposing antennae of said even number of slender, cylindrically-shaped, and downwardly-extending exterior antennae flows to said summation device and is combined thereby so as to provide a combined current;

b) a high frequency interface being in electrical communication with said summation device and said pair of slip rings, so that said combined current flows from said summation device to said pair of slip rings; and c) a detector being in electrical communication with said pair of immovable brushes and said amplifier, so that said combined current flows from said detector to said amplifier.

7. The helicopter system including the helicopter as defined in claim 1; further comprising:

a) a sampling unit being in electrical communication with said even number of slender, cylindrically-shaped, and downwardly-extending exterior antennae; said sampling unit receiving and sampling said current from said even number of slender, cylindrically-shaped, and downwardly-extending exterior antennae to obtain a most recently taken current sample and remove noise therefrom;

b) a memory block being in electrical communication with said sampling unit for storing said most recently taken current sample and all previously taken current samples previously sampled by said sampling unit; and c) an analyzing device being in electrical communication with said memory block for comparing said most recently taken current sample with said all previously taken current samples in said memory block and generating therefrom an updated indication of boundaries of the landing site as said helicopter homes in on the landing site so as to provide additional precision in landing said helicopter on the landing site since said radio waves received by said even number of slender, cylindrically-shaped, and downwardly-extending exterior antennae are constantly sampled and compared allowing for continuous correction of position of said helicopter relative to the landing site, so that the pilot is further assisted in landing said helicopter on the landing site.

8. A method of assisting a pilot in landing a helicopter with a linear and an angular speed on a landing site, especially during poor visibility, said method comprising the steps of:

a) generating radio waves by radio wave generating means at the landing site; said radio waves having amplitudes and a wave length;

b) rotating a plurality of blades of said helicopter;

c) receiving said radio waves by an even number of slender, cylindrically-shaped, and downwardly-extending exterior antennae extending downwardly from tips of said plurality of blades of said helicopter;

d) varying angular velocity of said plurality of blades for fine tuning reception of said radio waves generated by said radio wave generating means;

e) varying pitch of said plurality of blades accordingly to said varying angular velocity of said plurality of blades for preventing a sudden change in altitude of said helicopter;

f) generating a current by said even number of slender, cylindrically-shaped, and downwardly-extending exterior antennae responsive to said radio waves received thereby;

g) transmitting said current from said even number of slender, cylindrically-shaped, and downwardly-extending exterior antennae through a plurality of coaxial cables contained longitudinally in said plurality of blades to a pair of slip rings fixedly attached to a shaft rotating with said plurality of blades;

h) transmitting said current from said pair of slip rings to a pair of immovable brushes while said plurality of blades rotate;

i) amplifying said current from said pair of immovable brushes by an amplifier so as to produce an amplified current;

j) transmitting said amplified current from said amplifier to a microcomputer interface;

k) transmitting said amplified current from said microcomputer interface to a microcomputer; and l) displaying a signal representative of said amplified current received by said microcomputer wherein said signal is a function of altitude of said even number of slender, cylindrically-shaped, and downwardly-extending exterior antennae above the landing site and said amplitude of said radio waves received by said even number of slender, cylindrically-shaped, and downwardly-extending exterior antennae, so that by monitoring said signal displayed on said display device said altitude of said helicopter above the landing site and proximity of said helicopter to the landing site can be monitored and used to assist the pilot of said helicopter in landing said helicopter on the landing site.

9. The method as defined in claim 8, wherein said current generated by said even number of slender, cylindrically-shaped, and downwardly-extending exterior antennae has an amplitude that is a function of said amplitudes of said radio waves received by said even number of slender, cylindrically-shaped, and downwardly-extending exterior antennae, said angular velocity of said plurality of blades, said linear speed of said helicopter, and number of said even number of slender, cylindrically-shaped, and downwardly-extending exterior antennae, and is inversely proportional to square of said altitude of said helicopter above said radio wave generating means, so that $$I_{max} = f(E_{max}, R_u, V, N, 1/h^2)$$

wherein:

$I_{max}$ is maximum value of said current generated by said even number of slender, cylindrically-shaped, and downwardly-extending exterior antennae;

$E_{max}$ is said amplitude of energy of said radio waves received by said even number of slender, cylindrically-shaped, and downwardly-extending exterior antennae;

$R_u$ is said angular velocity of said plurality of blades of said helicopter expressed in revolutions per second;

V is said linear speed of said helicopter expressed in meters per second;

N is said number of said even number of slender, cylindrically-shaped, and downwardly-extending exterior antennae; and h is said altitude of said helicopter above said radio wave generating means expressed in meters.

10. The method as defined in claim 9, wherein said V is said angular speed of said helicopter relative to said radio wave generating means when said helicopter has reached a low altitude above said radio wave generating means, so that $$V/h = R_{u2}$$

and therefore $$I_{max} = f(E_{max}, R_u, R_{u2}, N, 1/h^2)$$

wherein:

$R_{u2}$ is said angular speed of said helicopter relative to said radio wave generating means.

11. The method as defined in claim 9, wherein said radio waves received by said even number of slender, cylindrically-shaped, and downwardly-extending exterior antennae have a frequency, so that $$F = (d/\lambda) \cdot (\pi n/30)$$

wherein:

F is said frequency of said radio waves received by said even number of slender, cylindrically-shaped, and downwardly-extending exterior antennae expressed in Hertz (1/sec);

n is said angular velocity of said plurality of blades expressed in number of revolutions per minute;

d is distance between opposing antennae of said even number of slender, cylindrically-shaped, and downwardly-extending exterior antennae; and $\lambda$ is said wavelength of said radio waves received by said even number of slender, cylindrically-shaped, and downwardly-extending exterior antennae expressed in meters.

12. The method as defined in claim 9, wherein said even number of slender, cylindrically-shaped, and downwardly-extending exterior antennae has a linear movement and said radio waves received by said even number of slender, cylindrically-shaped, and downwardly-extending exterior antennae have a frequency that is said linear movement of said even number of slender, cylindrically-shaped, and downwardly-extending exterior antennae relative to said radio waves generated by said radio wave generating means, so that $$F = (d/\lambda) \cdot (V/h)$$

wherein:

F is said frequency of said radio waves received by said even number of slender, cylindrically-shaped, and downwardly-extending exterior antennae expressed in Hertz (1/sec);

V is said linear speed of said helicopter expressed in meters/sec;

d is distance between opposing antennae of said even number of slender, cylindrically-shaped, and downwardly-extending exterior antennae expressed in meters;

λ is said wavelength of said radio waves received by said even number of slender, cylindrically-shaped, and downwardly-extending exterior antennae expressed in meters; and h is altitude of said even number of slender, cylindrically-shaped, and downwardly-extending exterior antennae above said radio wave generating means expressed in meters.

13. The method as defined in claim 9; further comprising the steps of:

a) combining said current from a pair of opposing antennae of said even number of slender, cylindrically-shaped, and downwardly-extending exterior antennae by a summation device being in electrical communication with said pair of opposing antennae of said even number of slender, cylindrically-shaped, and downwardly-extending exterior antennae;

b) transmitting said combined current from said summation device to a high frequency interface; and c) transmitting said combined current from said high frequency interface to a detector.

14. The method as defined in claim 9; further comprising the steps of:

a) sampling said current from said even number of slender, cylindrically-shaped, and downwardly-extending exterior antennae to obtain a most recently taken current sample by a sampling device;

b) removing noise from said most recently taken current sample by said sampling device;

c) storing said most recently taken current sample and all previously taken current samples previously sampled in a memory block;

d) comparing said most recently taken current sample with said all previously taken current samples in said memory block by an analyzing device; and e) generating an updated indication therefrom of boundaries of the landing site by said analyzing device as said helicopter homes in on the landing site so as to provide additional precision in landing said helicopter on the landing site since said radio waves received by said even number of slender, cylindrically-shaped, and downwardly-extending exterior antennae are constantly sampled and compared allowing for continuous correction of position of said helicopter relative to the landing site, so that the pilot is further assisted in landing said helicopter on the landing site.

15. A method of assisting a pilot in landing a helicopter on a landing site wherein said helicopter has a linear speed and an angular speed, comprising the step of homing in on the landing site with a helicopter pilot landing assisting device which comprises:

a) radio wave generating means for generating radio waves at the landing site; said radio waves having amplitudes and a wave length;

b) a helicopter body;

c) a shaft rotatively mounted to said helicopter body;

d) a pair of slip rings fixedly attached to said shaft for rotation therewith;

e) a plurality of blades having tips and being attached to said shaft for rotation therewith; said plurality of blades having a variable pitch and a variable angular velocity, so that as said variable angular velocity of said plurality of blades varies to allow for fine tuning of reception of said radio waves generated by said radio wave generating means, said variable pitch of said plurality of blades varies accordingly so as to prevent a sudden change in altitude of said helicopter;

f) an even number of slender, cylindrically-shaped, and downwardly-extending exterior antennae for receiving said radio waves generated by said radio wave generating means and generating a current responsive thereto; each antenna of said even number of slender, cylindrically-shaped, and downwardly-extending exterior antennae extending downwardly from a tip of a different blade of said plurality of blades;

g) a plurality of coaxial cables; each cable of said plurality of coaxial cables extending longitudinally through a different blade of said plurality of blades from an antenna of said even number of slender, cylindrically-shaped, and downwardly-extending exterior antennae to said pair of slip rings, so that said even number of slender, cylindrically-shaped, and downwardly-extending exterior antennae are in electrical communication with said pair of slip rings and said current generated by said even number of slender, cylindrically-shaped, and downwardly-extending exterior antennae flows to said pair of slip rings;

h) a pair of immovable brushes being in electrical communication with said pair of slip rings while said plurality of blades rotate, so that said current flows from said pair of slip rings to said pair of immovable brushes while said plurality of blades rotate;

i) an amplifier being in electrical communication with said pair of immovable brushes and amplifying said current from said pair of immovable brushes, so that said current flows from said pair of immovable brushes to said amplifier and is amplified thereby so as to produce an amplified current;

j) a microcomputer interface being in electrical communication with said amplifier, so that said amplified current flows from said amplifier to said microcomputer interface;

k) a microcomputer being in electrical communication with said microcomputer interface, so that said amplified current flows from said microcomputer interface to said microcomputer; and l) a display device being in electrical communication with said microcomputer for displaying a signal representative of said amplified current, so that said amplified current flows from said microcomputer to said display device; said signal being a function of altitude of said even number of slender, cylindrically-shaped, and downwardly-extending exterior antennae above the landing site and said amplitude of said radio waves received by said even number of slender, cylindrically-shaped, and downwardly-extending exterior antennae, so that by monitoring said signal displayed on said display device said altitude of said helicopter above the landing site and proximity of said helicopter to the landing site can be monitored and used to assist the pilot of said helicopter in landing said helicopter on the landing site.

16. The method as defined in claim 15, wherein said current generated by said even number of slender, cylindrically-shaped, and downwardly-extending exterior antennae has an amplitude that is a function of said amplitudes of said radio waves received by said even number of slender, cylindrically-shaped, and downwardly-extending exterior antennae, said angular velocity of said plurality of blades, said linear speed of said helicopter, and number of antennae of said even number of slender, cylindrically-shaped, and downwardly-extending exterior antennae, and is inversely proportional to square of said altitude of said helicopter above said radio wave generating means, so that $$I_{max} = f(E_{max}, R_u, V, N, 1/h^2)$$

wherein:

$I_{max}$ is maximum value of said current generated by said even number of slender, cylindrically-shaped, and downwardly-extending exterior antennae;

$E_{max}$ is said amplitude of energy of said radio waves received by said even number of slender, cylindrically-shaped, and downwardly-extending exterior antennae;

$R_u$ is said angular velocity of said plurality of blades of said helicopter expressed in revolutions per second;

V is said linear speed of said helicopter expressed in meters per second;

N is said number of said even number of slender, cylindrically-shaped, and downwardly-extending exterior antennae; and h is said altitude of said helicopter above said radio wave generating means expressed in meters.

17. The method as defined in claim 16, wherein said V is said angular speed of said helicopter relative to said radio wave generating means when said helicopter has reached a low altitude above said radio wave generating means, so that $$V/h = R_{u2}$$

and therefore $$I_{max} = f(E_{max}, R_u, R_{u2}, N, 1/h^2)$$

wherein:

$R_{u2}$ is said angular speed of said helicopter relative to said radio wave generating means.

18. The method as defined in claim 15, wherein said radio waves received by said even number of slender, cylindrically-shaped, and downwardly-extending exterior antennae have a frequency, so that $$F = (d/\lambda) \cdot (\pi n/30)$$

wherein:

F is said frequency of said radio waves received by said even number of slender, cylindrically-shaped, and downwardly-extending exterior antennae expressed in Hertz (1/sec);

n is said angular velocity of said plurality of blades expressed in number of revolutions per minute;

d is distance between opposing antennae of said even number of slender, cylindrically-shaped, and downwardly-extending exterior antennae; and $\lambda$ is said wavelength of said radio waves received by said even number of slender, cylindrically-shaped, and downwardly-extending exterior antennae expressed in meters.

19. The method as defined in claim 15, wherein said even number of slender, cylindrically-shaped, and downwardly-extending exterior antennae has a linear movement and said radio waves received by said even number of slender, cylindrically-shaped, and downwardly-extending exterior antennae have a frequency that is said linear movement of said even number of slender, cylindrically-shaped, and downwardly-extending exterior antennae relative to said radio waves generated by said radio wave generating means, so that $$F = (d/\lambda) \cdot (V/h)$$

wherein:

F is said frequency of said radio waves received by said even number of slender, cylindrically-shaped, and downwardly-extending exterior antennae expressed in Hertz (1/sec);

V is said linear speed of said helicopter expressed in meters/sec;

d is distance between opposing antennae of said even number of slender, cylindrically-shaped, and downwardly-extending exterior antennae expressed in meters;

$\lambda$ is said wavelength of said radio waves received by said even number of slender, cylindrically-shaped, and downwardly-extending exterior antennae expressed in meters; and h is distance of said even number of slender, cylindrically-shaped, and downwardly-extending exterior antennae above said radio wave generating means expressed in meters.

20. The method as defined in claim 15, wherein said helicopter pilot landing assisting device further comprises:

a) a summation device being in electrical communication with a pair of opposing antennae of said even number of slender, cylindrically-shaped, and downwardly-extending exterior antennae; said summation device receiving and combining said current from said pair of opposing antennae of said even number of slender, cylindrically-shaped, and downwardly-extending exterior antennae, so that said current from said pair of opposing antennae of said even number of slender, cylindrically-shaped, and downwardly-extending exterior antennae flows to said summation device and is combined thereby so as to provide a combined current;

b) a high frequency interface being in electrical communication with said summation device and said pair of slip rings, so that said combined current flows from said summation device to said pair of slip rings; and c) a detector being in electrical communication with said pair of immovable brushes and said amplifier, so that said combined current flows from said detector to said amplifier.

21. The method as defined in claim 15, wherein said helicopter pilot landing assisting device further comprises:

a) a sampling unit being in electrical communication with said even number of slender, cylindrically-shaped, and downwardly-extending exterior antennae; said sampling unit receiving and sampling said current from said even number of slender, cylindrically-shaped, and downwardly-extending exterior antennae to obtain a most recently taken current sample and remove noise therefrom;

b) a memory block being in electrical communication with said sampling unit for storing said most recently taken current sample and all previously taken current samples previously sampled by said sampling unit; and c) an analyzing device being in electrical communication with said memory block for comparing said most recently taken current sample with said all previously taken current samples in said memory block and generating therefrom an updated indication of boundaries of the landing site as said helicopter homes in on the landing site so as to provide additional precision in landing said helicopter on the landing site since said radio waves received by said even number of slender, cylindrically-shaped, and downwardly-extending exterior antennae are constantly sampled and compared allowing for continuous correction of position of said helicopter relative to the landing site, so that the pilot is further assisted in landing said helicopter on the landing site.

* * * * *